United States Patent
Kyoto et al.

(10) Patent No.: US 7,011,417 B2
(45) Date of Patent: Mar. 14, 2006

(54) IMAGE PROJECTOR LAMP DOOR WITH SCREW TUNING COMPONENT

(75) Inventors: Tomoaki Kyoto, Osaka (JP); Kazutoshi Takemi, Osaka (JP)

(73) Assignee: Funai Electric Co., Ltd., Daito (JP)

( * ) Notice: Subject to any disclaimer, the term of this patent is extended or adjusted under 35 U.S.C. 154(b) by 0 days.

(21) Appl. No.: 10/849,772

(22) Filed: May 21, 2004

(65) Prior Publication Data

US 2004/0233400 A1    Nov. 25, 2004

(30) Foreign Application Priority Data

May 21, 2003   (JP) .............................. 2003-143539

(51) Int. Cl.
*G03B 17/00* (2006.01)
*G03B 21/00* (2006.01)
*G03B 21/20* (2006.01)
*G03B 21/22* (2006.01)

(52) U.S. Cl. ........................... 353/119; 353/85; 352/243

(58) Field of Classification Search .................. 353/85, 353/119, 17, 42, 43, 52, 72, 74, 82, 97, 100; 352/242, 243; 312/7.2, 10.1, 21, 22, 23, 312/24, 26, 27, 30, 199, 200, 222, 249.3
See application file for complete search history.

(56) References Cited

U.S. PATENT DOCUMENTS

| | | | |
|---|---|---|---|
| 6,345,896 B1 * | 2/2002 | Kurosawa | 353/119 |
| 6,523,960 B1 * | 2/2003 | Watanabe | 353/98 |
| 6,755,541 B1 * | 6/2004 | Nakano et al. | 353/119 |

FOREIGN PATENT DOCUMENTS

| | | |
|---|---|---|
| JP | 59-30128 | 2/1984 |
| JP | 4-104644 | 9/1992 |
| JP | 10-268425 | 10/1998 |
| JP | 2002-333668 | 11/2002 |
| JP | 2002-344848 | 11/2002 |

* cited by examiner

*Primary Examiner*—Melissa Jan Koval
(74) *Attorney, Agent, or Firm*—Crowell & Moring LLP

(57) ABSTRACT

An image projector includes a lamp box containing a lamp, a case for forming a housing for the projector and having an opening for inserting the lamp box into the housing, a lamp housing provided inside the case and used for fixing the lamp box, and a lamp door removably attached to the case and used for opening and closing the opening. The lamp door has a screw-turning component capable of engaging with a groove on the head of the fixing screw when removed from the case, and threadable tightening/loosening can be performed by rotating the lamp door with the screw-turning component engaged with the groove in the fixing screw. This allows the lamp box to be replaced without the need for a screw-turning tool.

6 Claims, 4 Drawing Sheets

IMAGE PROJECTOR LAMP DOOR WITH SCREW TUNING COMPONENT

BACKGROUND OF THE INVENTION

1. Field of the Invention

The present invention relates to an image projector for projecting an image and displaying it on a screen or the like.

2. Description of the Related Art

There have been known image projectors for using light emitted from a lamp to form an image by means of an image-forming element on the basis of image data from a personal computer, video camera, or the like, and projecting and displaying that image on a screen or the like. This type of image projector has a structure whereby a lamp box containing a lamp can be placed in a case equipped with an image-forming element, and the lamp can be replaced when it becomes unusable due to deterioration or reaching the end of its service life. The lamp is replaced along with the lamp box by removing the lamp box that contains the unusable lamp from the case (case) and installing a lamp box that contains a usable lamp in the case.

In this type of image projector, the lamp box is installed by a procedure in which the lamp door of the case is opened, the lamp box is inserted into the cease from that opening, and the lamp box is secured with a screw inside the case. After installation of the lamp box, the lamp door is closed. The lamp box may also be removed by the reverse procedure.

Also, there are known projection-type display devices configured such that when the lamp box is at or above a prescribed temperature, removal of the lamp box from the chassis is restricted by locking the lamp box and the lamp cover with the aid of a locking mechanism that uses a bimetal (see Japanese Laid-open Patent Publication 2002-333668, for example).

Furthermore, there are known liquid crystal video projectors configured such that a protrusion is provided on a cover for covering the opening from which a lamp holder is inserted and taken out, and a lock lever for enabling a power cord to be drawn out to an AC inlet is depressed when the cover is not covering the opening (see Japanese Laid-open Patent Publication H10-268425, for example).

Additionally, there are known projectors configured such that a cover is installed for protecting the projection lens, and power cannot be supplied to the light source lamp when the cover is in place (see Japanese Laid-open Patent Publication 2002-344848, for example).

Also, there are known locking devices for a lamp replacement cover on a lamp-holding chassis that are configured such that a hook member that can be heat-reversibly deformed is provided to the chassis, and a catch member for catching on the heat-reversibly deforming hook member is provided to the lamp replacement cover (see Japanese Laid-open Patent Publication S59-30129, for example).

Furthermore, there are known projection-type liquid crystal projectors configured such that a side barrier portion facing a lamp box is split to form a lamp side cover (see Japanese Laid-open Utility Model Publication H4-104644, for example).

SUMMARY OF THE INVENTION

During use of the image projector, the lamp sometimes becomes unusable due to deterioration or reaching the end of its service life and must be replaced unexpectedly. In the conventional image projector described above, a tool is required for turning the screw when replacing the lamp, because the lamp box is secured to the inside of the case by a screw. Consequently, when the lamp becomes unusable due to deterioration or reaching the end of its service life, if a screw-turning tool cannot be provided, the lamp cannot be replaced, which creates a situation in which the image projector cannot be used. Also, even if the measures disclosed in the patent references described above are put in place, the above-mentioned drawback cannot be overcome.

The present invention was developed in order to overcome the above-mentioned drawback, and an object thereof is to provide an image projector in which the lamp box can be replaced without the need for a screw-turning tool.

To achieve the above-mentioned object, there is provided an image projector for forming an image using a lamp for emitting image projection light and an image forming element, and projecting the image, comprising: a lamp box containing the lamp; a case for forming a housing for the projector, and having an opening for inserting the lamp box into the housing; a lamp housing provided inside the case and used for fixing the lamp box; and a lamp door removably attached to the case and used for opening and closing the opening; wherein the lamp box has a screw-inserting component through which a fixing screw for fixing the lamp box to the lamp housing is threaded; the lamp housing has a screw cramp for fixing the fixing screw threaded through the screw-inserting component; and the lamp door has a screw-turning component capable of engaging with a groove on the head of the fixing screw when removed from the case, and threadable tightening/loosening can be performed by rotating the lamp door with the screw-turning component engaged with the groove in the fixing screw.

By means of the present invention, when replacing the lamp box, the lamp door is removed from the case and the fixing screw can be turned by means of a screw-turning component on the lamp door. Therefore, even when a screw-turning tool cannot be provided, removal and fixing of the lamp box can be performed using the lamp door. By this means, even when the lamp must be replaced unexpectedly, a situation does not arise in which the lamp cannot be replaced and the image cannot be displayed due to the inability to provide a screw-turning tool.

In the present invention, adopting a configuration in which a rib extends in a straight line makes it easy for the leading end of the rib to be locked in the head portion of the lamp box fixing screw, and to tighten or loosen the lamp box fixing screw.

Also, if a reinforcing component is provided to the base end of the rib, the lamp box fixing screw can be reliably tightened or loosened when this lamp box fixing screw is tightened or loosened.

Also, if a configuration is adopted whereby the leading end of the rib presses on the operating tab of a detection switch for detecting attachment of the lamp door when the lamp door is in the attached position, it is possible to detect that the lamp door is attached.

DESCRIPTION OF THE PREFERRED EMBODIMENTS

Figure 1:
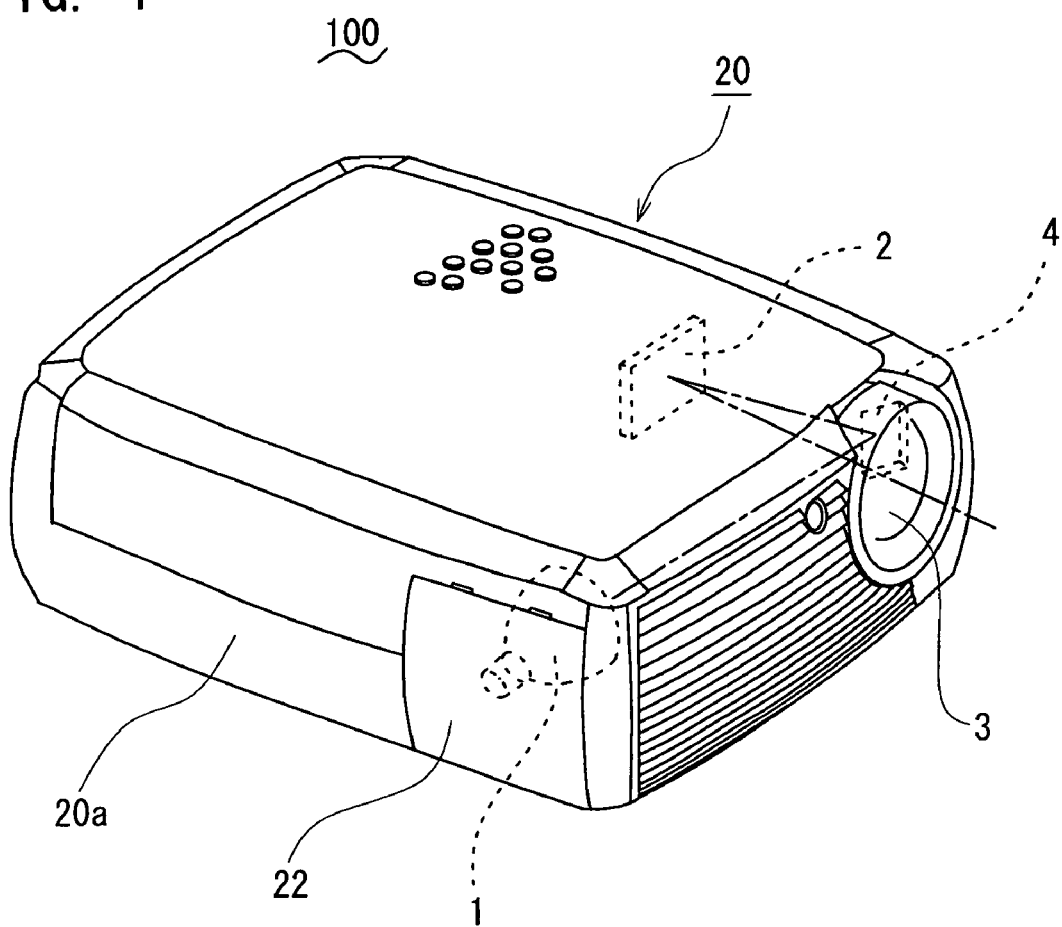
FIG. 1 is an oblique view depicting an outline of the structure of the image projector pertaining to an embodiment of the present invention.
Figure 2:
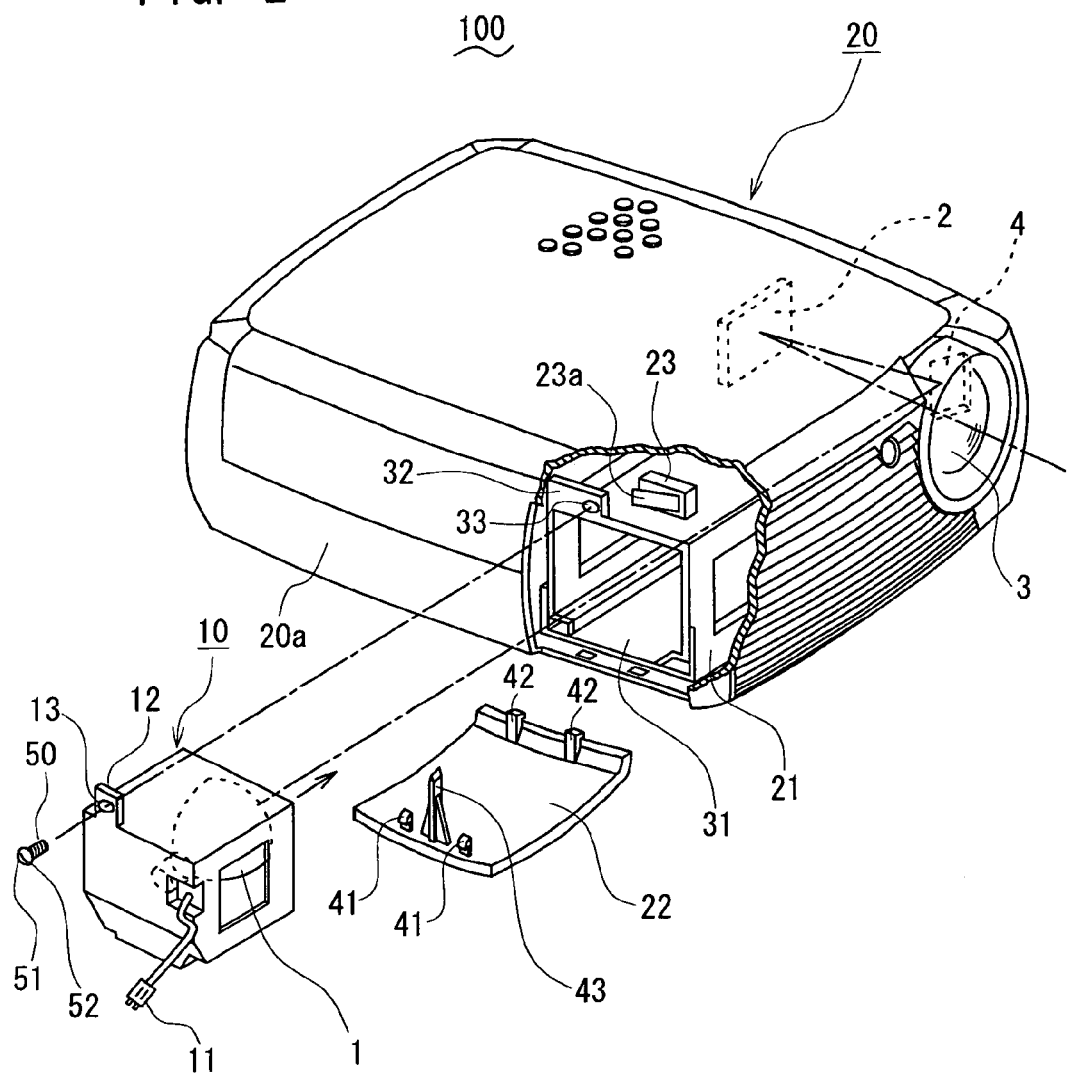
FIG. 2 is an oblique view depicting a state in which the lamp box of the same projector is removed from the case.

A specific embodiment will be described hereinafter with reference to the drawings. In FIGS. 1 and 2, an image projector 100 comprises a device whereby an image is formed by an image forming element 2 using light used for image projection emitted from a lamp 1, based on an image signal inputted from a personal computer, video camera, or the like; and the image is projected and displayed from a projection lens 3 onto a screen, wall surface, or the like. The device is configured such that a lamp box 10 that contains the lamp 1 can be inserted into the case (hereinafter referred to as "the case") 20.

The lamp box 10 contains the lamp 1 and is provided with a connector 11 and a screw-inserting component 12. The connector 11 is designed to supply electrical power to the lamp 1. The screw-inserting component 12 is designed to threadably secure the lamp box 10 inside the case 20, is disposed in the rear panel of the lamp box 10 so as to protrude upward, and has a screw hole 13.

The case 20 is equipped with a reflecting mirror 4 in addition to the image forming element 2 and projection lens 3 described above. The image forming element 2 is configured using, for example, a reflecting DLP (digital lighting processor) whose image forming surface is configured with numerous micro-mirrors arranged in a matrix, and radiated light is reflected and an image is formed by controlling the angle of the micro-mirrors by means of a signal from a controller (not pictured). The reflecting mirror 4 reflects the image projection light emitted from the lamp 1, and illuminates the image forming element 2. The projection lens 3 projects the light reflected from the image forming surface of the image forming element 2, specifically, the image formed in the image forming element 2, onto a screen, wall surface, or the like.

Also, the case 20 is provided with a lamp housing 21, a lamp door 22, and a detection switch 23. The lamp housing 21 is fixed such that the lamp box 10 described above can be inserted into the case 20, has a space formed therein for installing the lamp box 10, and has an opening 31 for inserting and removing the lamp box 10 and a screw cramp 32 for screwing on the lamp box 10. The screw cramp 32 is disposed at the edge of the opening 31 so as to protrude upward from the lamp housing 21, and has a screw hole 33.

The lamp box 10 is inserted into the lamp housing 21 in a direction that is substantially perpendicular to the side panel 20a of the case 20. The screw hole 13 of the lamp box 10 and the screw hole 33 of the lamp housing 21 are aligned with each other when the lamp box 10 is installed in the lamp housing 21. The lamp box 10 is screwed to the lamp housing 21 by threading the lamp box fixing screw 50 through the screw hole 13 and screw hole 33, with the lamp box 10 installed in the lamp housing 21. The lamp box fixing screw 50 used in the present embodiment has a linear screw-turning groove 52 on the head 51 thereof. The screw hole 13 and screw hole 33 are formed such that the lamp box fixing screw 50 can be advanced and retracted in the direction parallel to the direction in which the lamp box 10 is inserted into the lamp housing 21, specifically, in a direction substantially perpendicular to the side panel 20a of the case 20.

The lamp door 22 opens and closes the opening 31 in the lamp housing 21, and is removably attached to the case 20. The lamp door 22 is formed out of plastic and has locking tabs 41 and 42 and a rib 43. Details of the lamp door 22 will be described hereinafter.

The detection switch 23 detects the installation state of the lamp door 22 on the case 20, is switched by pressing on the operating tab 23a, and detects a state in which the operating tab 23a is pressed as corresponding to a state in which the lamp door 22 is in place (specifically, the opening 31 in the lamp housing 21 is closed). The detection switch 23 is disposed on top of the lamp housing 21 and farther inward than the screw cramp 32 (consequently, the screw-inserting component 12 of the lamp box 10 is positioned closer to the lamp door 22 than the detection switch 23).

Figure 3:
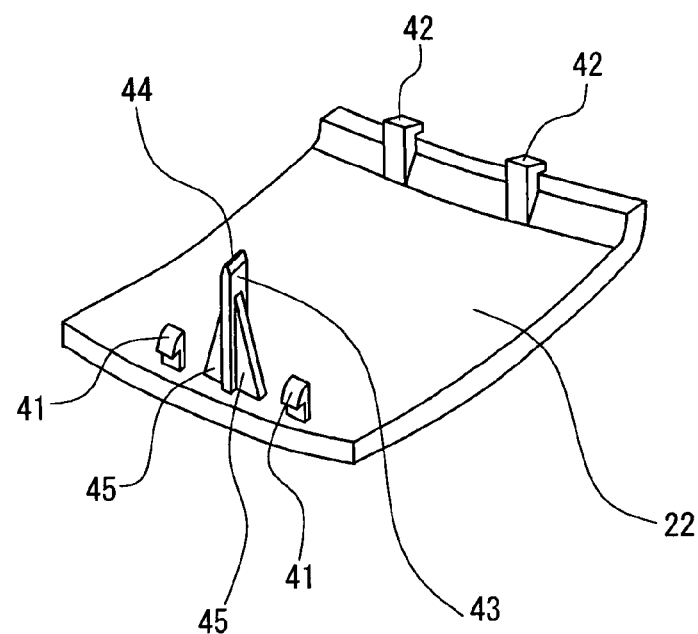
FIG. 3 is an oblique view depicting the structure of the lamp door of the same projector.

The above-mentioned lamp door 22 will next be described with reference to FIGS. 3 and 4. The lamp door 22 has locking tabs 41 and 42 and a rib 43, as described above. The locking tab 41 is a component for attaching the lamp door 22 to the case 20. The rib 43 consists of a component for pressing the operating tab 23 a of the detection switch 23, and also consists of a screw-turning component by which the lamp box fixing screw 50 can be turned. The locking tabs 41 and 42 and the rib 43 are formed integrally with the lamp door 22 out of plastic.

The rib 43 extends straight outward from the internal surface of the lamp door 22, and the leading end 44 thereof is formed in a shape that is capable of engaging with the head 51 of the lamp box fixing screw 50. The lamp box fixing screw 50 has a linear screw-turning groove 52 on the head 51 thereof as described above, and the leading end 44 of the rib 43 in the present embodiment is therefore formed in a narrow linear shape that can engage with the screw-turning groove 52 (specifically, the head 51) (see FIG. 3). Reinforcers 45 are formed at the base end of the rib 43. The reinforcers 45 enhance the resistance to twisting around the direction of extension of the rib 43.

Figure 4:
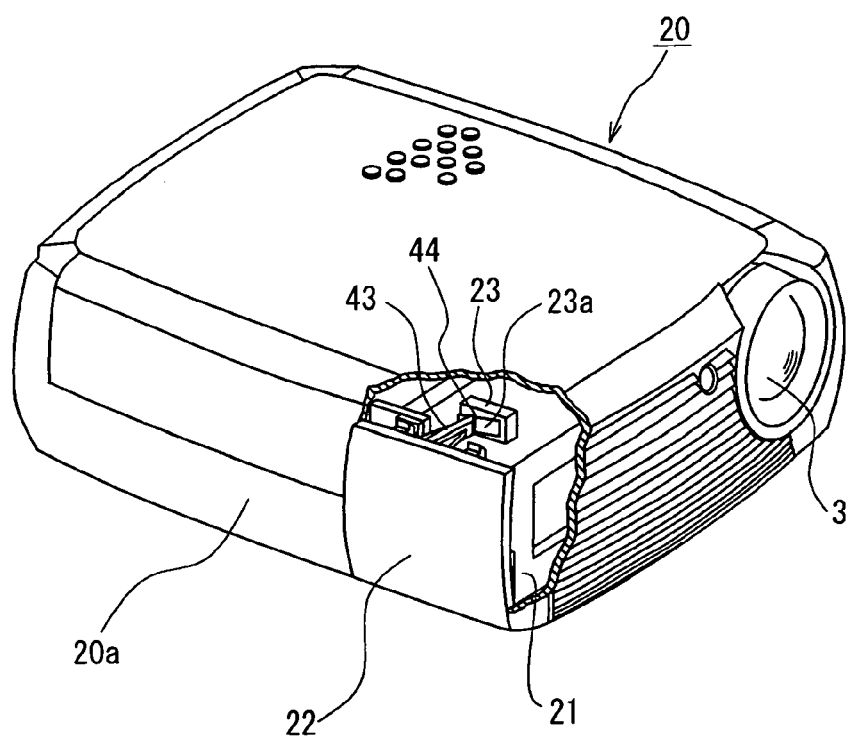
FIG. 4 is an oblique partial cut-away view depicting a state in which the rib of the lamp door of the same projector is pressing on the operating tab of the detection switch.

Also, the rib 43 is positioned at the top of the lamp housing 21 when the lamp door 22 is attached to the case 20, and is configured such that the leading end 44 thereof presses on the operating tab 23a of the detection switch 23 (see FIG. 4). The rib 43 has a length sufficient to press on the operating tab 23a of the detection switch 23, whereas the screw-inserting component 12 of the lamp box 10 is positioned closer to the lamp door 22 than to the detection switch 23. Consequently, the rib 43 is of a length whereby the leading end 44 thereof can reach the screw-inserting component 12 of the lamp box 10 when the lamp door 22 has been removed from the case 20.

Figure 5:
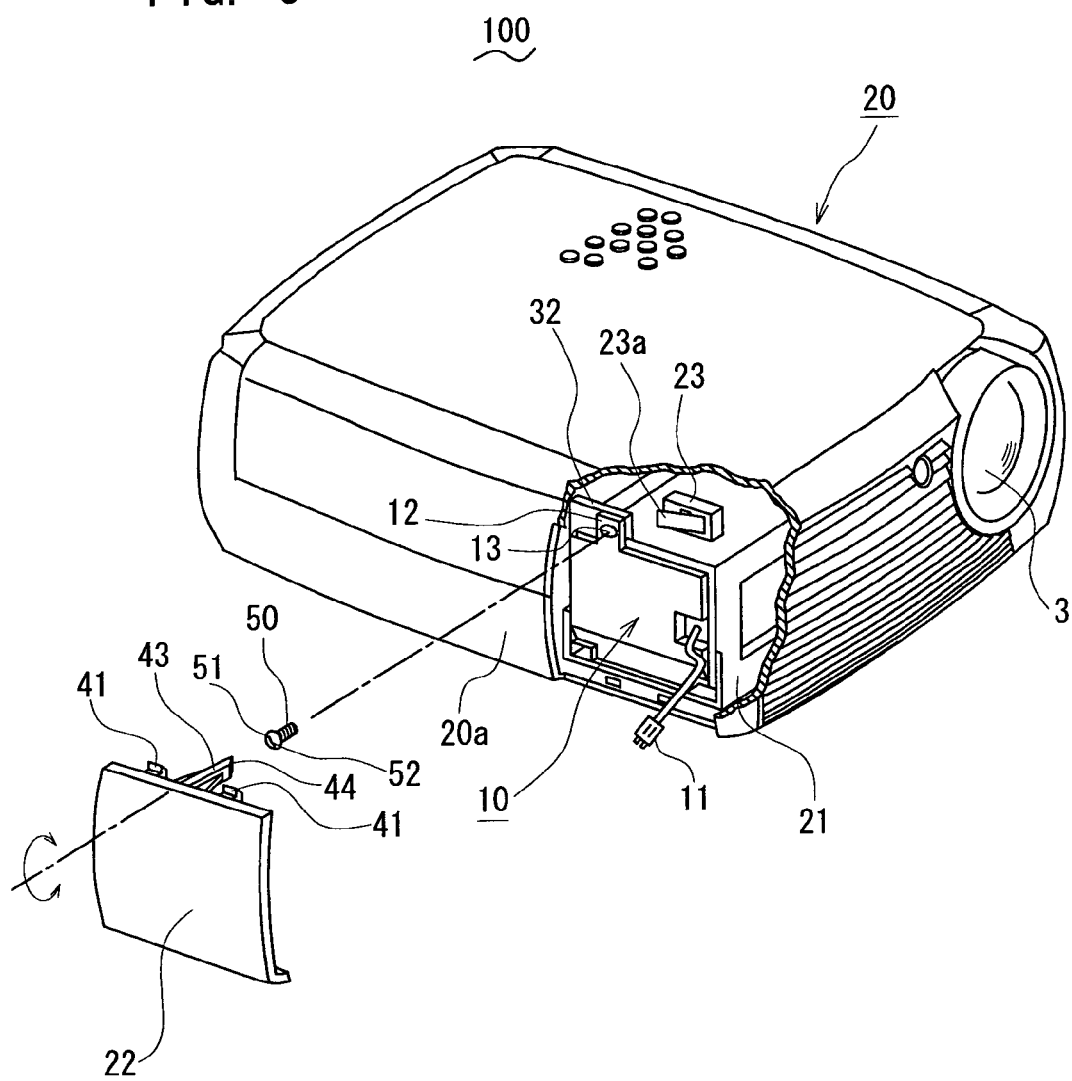
FIG. 5 is an oblique partial cut-away view depicting the operation of a lamp box fixing screw that uses the rib of the lamp door of the same projector.

The operation performed when replacing the lamp box 10 in the image projector 100 thus configured is described with reference to FIG. 5. A state is described in which the lamp door 22 is removed, the lamp box 10 is inserted into the lamp housing 21, and the screw-inserting component 12 of the lamp box 10 is placed over the screw cramp 32 of the lamp housing 21. In this state, tightening or loosening of the lamp box fixing screw 50 is performed by engaging the leading end 44 of the rib 43 on the lamp door 22 with the screw-turning groove 52 on the head 51 of the lamp box fixing screw 50, and rotating the lamp door 22 about the direction of extension of the rib 43. Thus, even when a screw-turning tool cannot be provided, the lamp box 10 can be replaced using the lamp door 22.

At this time, the rib 43 stands substantially perpendicular to the lamp door 22; hence, the lamp door 22 can be rotated without touching the side panel 20a of the case 20, and tightening or loosening of the lamp box fixing screw 50 can easily be performed. Also, the rib 43 extends straight outward; hence, the leading end 44 of the rib 43 is easily engaged with the screw-turning groove 52 of the lamp box fixing screw 50, and tightening and loosening of the lamp box fixing screw 50 can easily be performed. However, the reinforcers 45 are provided at the base end of the rib 43; hence, when the lamp door 22 is rotated to perform tightening or loosening of the lamp box fixing screw 50, this operating force can be reliably transmitted to the lamp box fixing screw 50, and the lamp box fixing screw 50 can be reliably tightened or loosened.

Also, by making it so that the leading end 44 of the rib 43 for pressing on the operating tab 23a of the detection switch 23 for detecting attachment of the lamp door can engage with the head 51 of the lamp box fixing screw 50, there is no need to provide a member separate from the rib 43 for turning the screw, and cost can be minimized.

Also, the present invention is not limited by the configuration of the above-mentioned embodiment, and various modifications can be made thereto. For example, in the above-mentioned embodiment, the rib 43 is not limited to being made of plastic, and may be metal, or metal that is insert molded into plastic. Also, the rib 43 need not necessarily double as a pressing component for pressing on the operating tab 23a of the detection switch 23 and a screw-turning component for turning the lamp box fixing screw 50. Specifically, a rib for pressing on the operating tab 23a may be provided separately from a rib for turning the lamp box fixing screw 50, and in a image projector 100 of a type that does not have a detection switch 23, the rib 43 becomes a dedicated screw-turning component for the lamp box fixing screw 50. The lamp box fixing screw 50 is not limited to having a linear screw-turning groove on the head thereof, and may have a cross-shaped groove or hexagonal pit on the head thereof, or the head itself may be formed in a hexagonal shape or the like. In these cases, the leading end 44 of the rib 43 should have a shape that fits each type of screw head.

What is claimed is:

1. An image projector for forming an image using a lamp for emitting image projection light and an image forming element, and projecting the image, comprising:
   a lamp box containing the lamp;
   a case for forming a housing for the projector, and having an opening for inserting the lamp box into the housing;
   a lamp housing provided inside the case and used for fixing the lamp box; and
   a lamp door removably attached to the case and used for opening and closing the opening; wherein
   the lamp box has a screw-inserting component through which a fixing screw for fixing the lamp box to the lamp housing is threaded;
   the lamp housing has a screw cramp for fixing the fixing screw threaded through the screw-inserting component; and
   the lamp door has a screw-turning component adapted to engage with a groove on the head of the fixing screw when removed from the case.

2. The image projector according to claim 1, wherein the screw-turning component comprises a rib standing on the inside surface of the lamp door and extending in a straight line, and wherein the leading end of the rib has a shape adapted to engage with the head of the screw.

3. The image projector according to claim 2, wherein the rib has reinforcing components at the base end thereof, thereby enhancing the resistance of the rib to twisting.

4. The image projector according to claim 1, further comprising:
   a detection switch provided inside the case and used for detecting that the lamp door is attached; and
   a pressing component formed integrally with the lamp door on the inner surface of the lamp door, wherein when the lamp door is attached to the case the pressing component presses on the operating tab of the detection switch.

5. The image projector according to claim 4, wherein the pressing component is the screw-turning component.

6. The image projector according to claim 4, wherein the screw-inserting component of the lamp box and the screw cramp of the lamp box are disposed closer to the lamp door than to the position of the detection switch and are placed over each other when the lamp box is inserted into the lamp housing.

* * * * *